US012017463B2

(12) United States Patent
Genta et al.

(10) Patent No.: US 12,017,463 B2
(45) Date of Patent: Jun. 25, 2024

(54) PRINTING CONTROL APPARATUS AND PRINTING CONTROL METHOD

(71) Applicant: CANON KABUSHIKI KAISHA, Tokyo (JP)

(72) Inventors: Shin Genta, Kanagawa (JP); Yuji Konno, Kanagawa (JP); Yoshitomo Marumoto, Kanagawa (JP); Naoko Baba, Kanagawa (JP); Jumpei Jogo, Tokyo (JP); Takayuki Ushiyama, Chiba (JP); Yumi Shimokodachi, Kanagawa (JP); Taichi Yokokawa, Kanagawa (JP); Serena Yoshikawa, Tokyo (JP)

(73) Assignee: CANON KABU SHIKI KAIS HA, Tokyo (JP)

( * ) Notice: Subject to any disclaimer, the term of this patent is extended or adjusted under 35 U.S.C. 154(b) by 36 days.

(21) Appl. No.: 17/981,525

(22) Filed: Nov. 7, 2022

(65) Prior Publication Data

US 2023/0150271 A1 May 18, 2023

(30) Foreign Application Priority Data

Nov. 12, 2021 (JP) ................................ 2021-185101

(51) Int. Cl.
*B41J 2/21* (2006.01)
*B41J 2/51* (2006.01)
*B41J 19/14* (2006.01)

(52) U.S. Cl.
CPC ............ *B41J 2/2103* (2013.01); *B41J 2/512* (2013.01); *B41J 19/142* (2013.01)

(58) Field of Classification Search
CPC ......... B41J 2/2103; B41J 2/512; B41J 19/142
See application file for complete search history.

(56) References Cited

U.S. PATENT DOCUMENTS

| | | | | |
|---|---|---|---|---|
| 6,779,873 | B2 | 8/2004 | Maeda et al. | |
| 7,758,154 | B2 | 7/2010 | Yokozawa | |
| 8,740,351 | B2 | 6/2014 | Tsuboi et al. | |
| 9,073,340 | B2 | 7/2015 | Marumoto et al. | |
| 9,085,185 | B2 | 7/2015 | Marumoto et al. | |
| 2005/0128234 | A1 | 6/2005 | Yokozawa | |
| 2017/0232732 | A1* | 8/2017 | Wolf ................... | G06K 15/107 347/14 |

FOREIGN PATENT DOCUMENTS

| | | |
|---|---|---|
| JP | 2005-169940 A | 6/2005 |

* cited by examiner

*Primary Examiner* — Justin Seo
(74) *Attorney, Agent, or Firm* — VENABLE LLP

(57) ABSTRACT

A printing control apparatus includes a control unit configured to perform control so that a distribution ratio based on which color separation data separated as having a predetermined color is distributed into data for a first nozzle array and a distribution ratio based on which color separation data is distributed into data for a second nozzle array are different depending on a tone value in the color separation data, and a generation unit configured to generate printing data to be used for printing by the first nozzle array based on the distributed data for the first nozzle array and generate printing data to be used for printing by the second nozzle array based on the distributed data for the second nozzle array.

8 Claims, 14 Drawing Sheets

| INPUT DATA (256 TONES) | FIRST NOZZLE ARRAY (FIRST MASK) | SECOND NOZZLE ARRAY (SECOND MASK) |
|---|---|---|
| 0 | 0 | 0 |
| . . . | . . . | . . . |
| 128 | 32 | 96 |
| . . . | . . . | . . . |
| 256 | 128 | 128 |

FIG.9

PRINTING CONTROL APPARATUS AND PRINTING CONTROL METHOD

BACKGROUND OF THE INVENTION

Field of the Invention

The present disclosure relates to a technique for printing an image by performing a plurality of print scans with respect to a unit area.

Description of the Related Art

For inkjet printing apparatuses, what is called a multi-pass printing method is known, in which all pixels in a region printable with a single scan are divided into a plurality of groups, and printing of the region is completed by a plurality of scans.

Japanese Patent Laid-Open No. 2005-169940 (hereinafter referred to as Literature 1) describes a technique for reducing color unevenness caused in multi-pass printing due to the order of ink ejection being different between a forward scan and a backward scan. Literature 1 describes using mutually complementary mask patterns so that out of two print heads that eject the same ink, a printing duty for the print head that precedes in the scanning direction may be higher than that for the following print head. A printing duty is a percentage of ink ejection.

The actual ejection amount of each ink color may change depending on a color to be outputted. For example, the ejection amount of magenta is different between a case where the hue of a color to be outputted is red (magenta+ yellow) and a case where the hue of a color to be outputted is blue (cyan+magenta). In their comparison with the same lightness value, red requires a larger amount of magenta to be ejected than blue does, and blue requires a smaller amount of magenta to be ejected than red does. In this way, a printing duty required of each ink color (ink ejection percentage) is not determined in a fixed manner, but may change depending on the color to be outputted. Because the ratio of the print duties is determined by mask patterns in a fixed manner in the technique in Literature 1, the mask patterns need to be changed in order to adjust the print duties.

SUMMARY OF THE INVENTION

A printing control apparatus according to one aspect of the present disclosure is a printing control apparatus configured to control a printing apparatus including a first nozzle array having ejection ports configured to eject an ink of a predetermined color and arranged in a sub scanning direction and a second nozzle array having ejection ports configured to eject an ink of the predetermined color and arranged in the sub scanning direction, the printing apparatus printing an image in a predetermined region on a print medium by scanning the first nozzle array and the second nozzle array N times (where N is an integer of 2 or greater) in a main scanning direction intersecting with the sub scanning direction, the printing control apparatus including: a control unit configured to perform control so that a distribution ratio based on which color separation data separated as having the predetermined color is distributed into data for the first nozzle array and a distribution ratio based on which the color separation data is distributed into data for the second nozzle array are different depending on a tone value in the color separation data, and a generation unit configured to generate printing data to be used for printing by the first nozzle array based on the distributed data for the first nozzle array and generate printing data to be used for printing by the second nozzle array based on the distributed data for the second nozzle array.

Further features of the present invention will become apparent from the following description of exemplary embodiments with reference to the attached drawings.

BRIEF DESCRIPTION OF THE DRAWINGS

FIG. 9 is a diagram illustrating a method for allotting tone values in input data to a first nozzle array and a second nozzle array;

DESCRIPTION OF THE EMBODIMENTS

Figure 1:
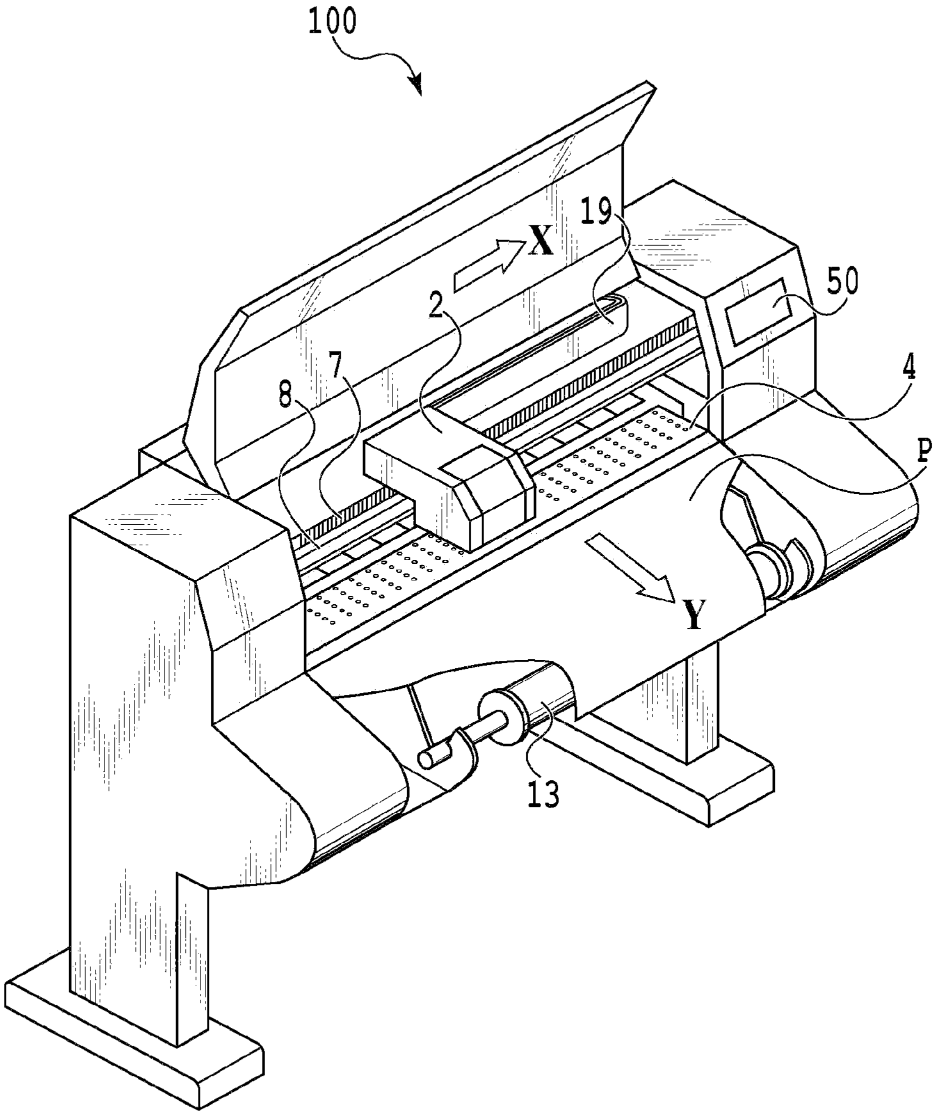
FIG. 1 is an outer appearance view of a printing apparatus.

Preferred embodiments of the present disclosure are described in detail below with reference to the drawings attached hereto. Note that the following embodiments are not to limit the matters disclosed herein and that not all the combinations of features described in the present embodiments are essential to the solutions provided by the present disclosure. Note that the same reference numeral is used to denote the same constituents to omit descriptions.

First Embodiment (1) Configuration of the Inkjet Printing Apparatus

Figure 2:
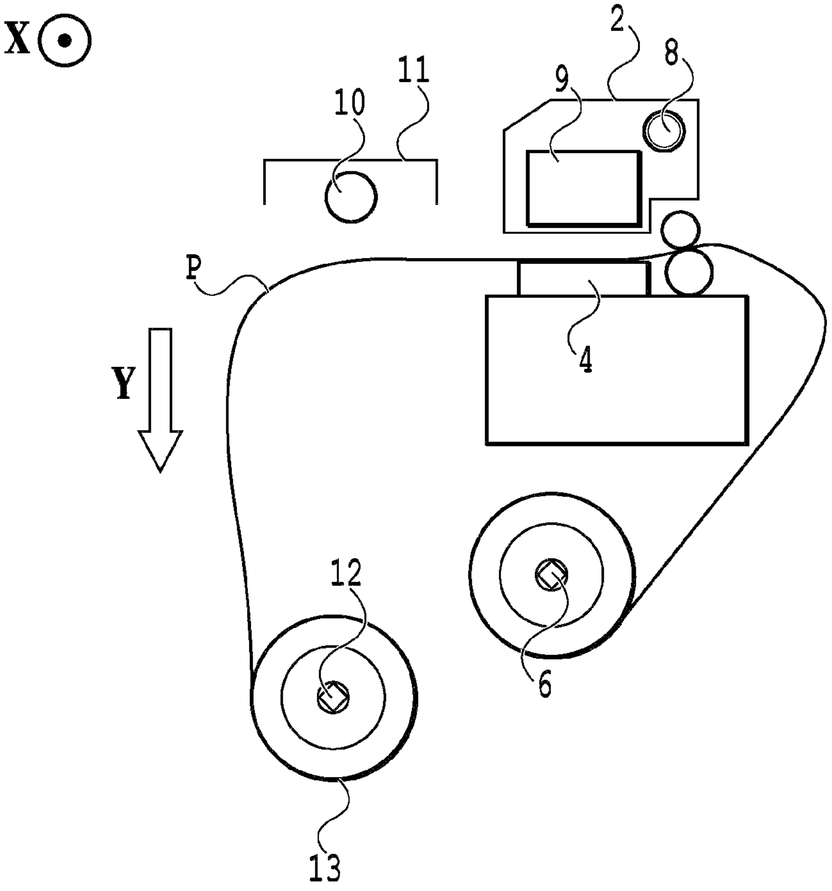
FIG. 2 is a side view of a main body of the printing apparatus.

FIG. 1 is a diagram showing an outer appearance of an inkjet printing apparatus (hereinafter also referred to as a printing apparatus or a printer) according to the present embodiment. A printing apparatus 100 in FIG. 1 is what is called a serial scanning printer and prints an image by scanning a print head in an X-direction (a scanning direction) orthogonal to a Y-direction (a conveyance direction) of a print medium P. FIG. 2 is a side view of the main body of the printing apparatus 100.

Using FIGS. 1 and 2, an overview of the configuration of the printing apparatus 100 and the operation of the printing apparatus 100 during printing is described. First, a conveyance roller driven via gears by a conveyance motor (not shown) conveys the print medium P in the Y-direction from a spool 6 holding the print medium P. Meanwhile, at a predetermined conveyance position, a carriage unit 2 is caused by a carriage motor (not shown) to scan back and forth (reciprocate) along a guide shaft 8 extending in the X-direction. Then, in the process of this scanning, at a timing based on a position signal obtained by an encoder 7, a print head 9 (to be described later) attachable to the carriage unit 2 performs an ejection operation from its ejection ports to perform printing of a band with a width corresponding to the range over which the ejection ports are arranged. In the configuration in the present embodiment, the ejection operation is performed with scans being made at a scan speed of 30 inches per second and with a printing resolution of 1200 dpi (the interval of 1/1200 inches). After that, the print medium P is conveyed, and printing for the next band width is performed.

Note that a carriage belt can be used to transmit the driving force from the carriage motor to the carriage unit 2. A driving mechanism other than the carriage belt can also be used, such as, for example, one including a lead screw and an engagement part, the lead screw extending in the X-direction and being driven and rotated by a carriage motor, the engagement part being provided at the carriage unit 2 and engaging with a groove on the lead screw.

The print medium P being fed is sandwiched and conveyed by a paper feed roller and a pinch roller and is led to a printing position on a platen 4 (a region scanned by the print head). Usually, the face surface of the print head 9 is capped in idle mode, and thus, the cap is opened before printing to make the print head 9 (the carriage unit 2) ready to scan. Then, after one scan worth of data is accumulated in a buffer, the carriage unit 2 is scanned by the carriage motor, and printing is performed as described above.

A flexible wiring substrate 19 is mounted to the print head 9 to supply, e.g., a drive pulse for ejection driving and a head temperature adjustment signal. The other end of the flexible wiring substrate 19 is connected to a controller (not shown) including a control circuit such as a CPU that executes control of the printer. A UI screen 50 is configured so that a user can input or check, e.g., information on a pause of the printing operation or information on the print medium P.

In a curing region located downstream, in the sub scanning direction Y, of a location where the print head 9 mounted to the carriage unit 2 reciprocates and scans in the main scanning direction X, a heater 10 supported by a frame (not shown) is situated. The heater 10 thermally dries an ink in liquid form on the print medium P. The heater 10 is covered with a heater cover 11. The heater cover 11 has a function to efficiently irradiate the print medium P with heat from the heater 10 and a function to protect the heater 10. After being printed by the print head 9, the print medium P is wound up by a wind-up spool 12 and forms a roll-shaped would-up medium 13. Specific examples of the heater 10 include a sheathed heater and a halogen heater. A heating temperature for a heating portion in the curing region is set considering the film formability and productivity of water-soluble resin fine particles and heat resistance of the print medium P. Note that examples of heating unit usable for the heating portion in the curing region include heating by hot air blowing from above and heating by a contact heat conductive heater from the underside of a print medium. In the example shown in the present embodiment, the heating unit for the heating portion at the curing region is provided at a single location. However, the heating unit may be provided at two or more locations and used together as long as temperatures measured by a radiation thermometer (not shown) above the print medium P do not exceed a set value for a heating temperature.

The printing apparatus 100 of the present embodiment can perform what is called multi-pass printing, in which an image is printed onto a predetermined region (a 1/n band) on the print medium P with a plurality of scans (n scans) by the print head. Details of the multi-pass printing will be described later.

(2) Configuration of the Print Head

Figure 3:
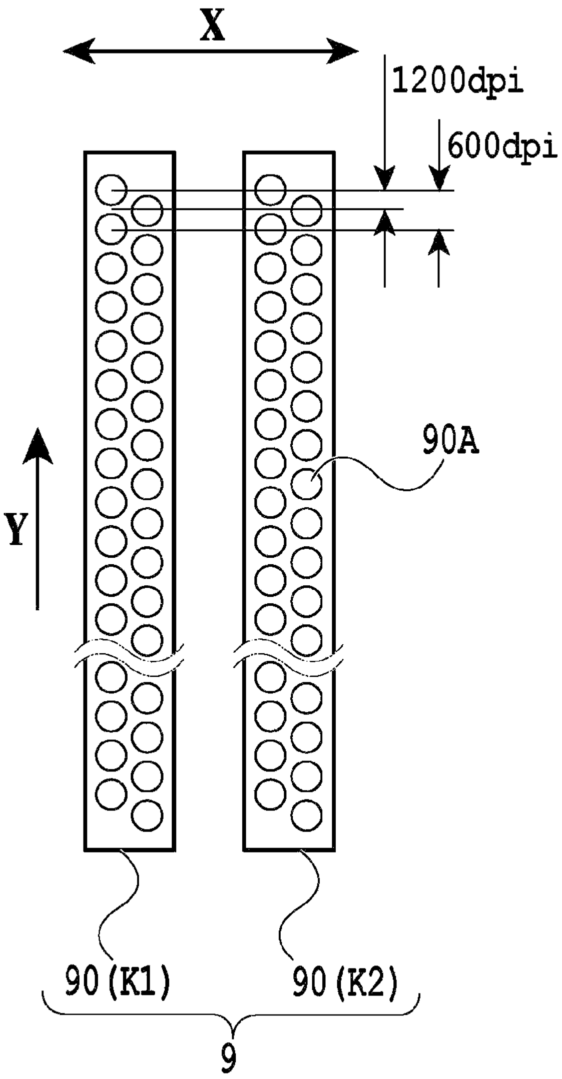
FIG. 3 is a diagram showing a print head.

FIG. 3 is a diagram showing the print head 9 according to the present embodiment. The print head 9 includes a first nozzle array 90 (K1) and a second nozzle array 90 (K2) that eject an ink of the same color (a black ink (K) as an example) as an ink containing a color material. Because the ink for the first nozzle array 90 (K1) and the second nozzle array 90 (K2) contains a color material and is therefore also referred to as a color material ink for brevity in the following description. Although a case of black ink is described as an example here, an ink of a different color may be used.

The print head 9 has ejection ports arranged in the sub scanning direction. Also, in the print head 9, the ejection port arrays are arranged side by side from the left side to the right side of the main scanning direction (the X-direction) in the order of the first nozzle array 90 (K1) and the second nozzle array 90 (K2). The first nozzle array 90 (K1) and the second nozzle array 90 (K2) are each formed by 1280 ejection ports 90A that are configured to eject an ink and arranged in the Y-direction (the arrangement direction, the sub scanning direction) at a density of 1200 dpi. Note that the amount of ink ejected from a single ejection port 90A at once is approximately 4.5 pl in the present embodiment.

The first nozzle array 90 (K1) and the second nozzle array 90 (K2) are each connected to an ink tank (not shown) storing a corresponding ink and is supplied with the ink. Note that the print head 9 and the ink tanks used in the present embodiment may be configured integrally or configured to be separable from each other. Also, although the print head 9 for one color, namely a black ink, is used and described as an example in the present embodiment, the print head may use inks of a plurality of colors. An example of a print head using inks of a plurality of colors will be described in a second embodiment.

(3) Configuration of the Printing System

Figure 4:
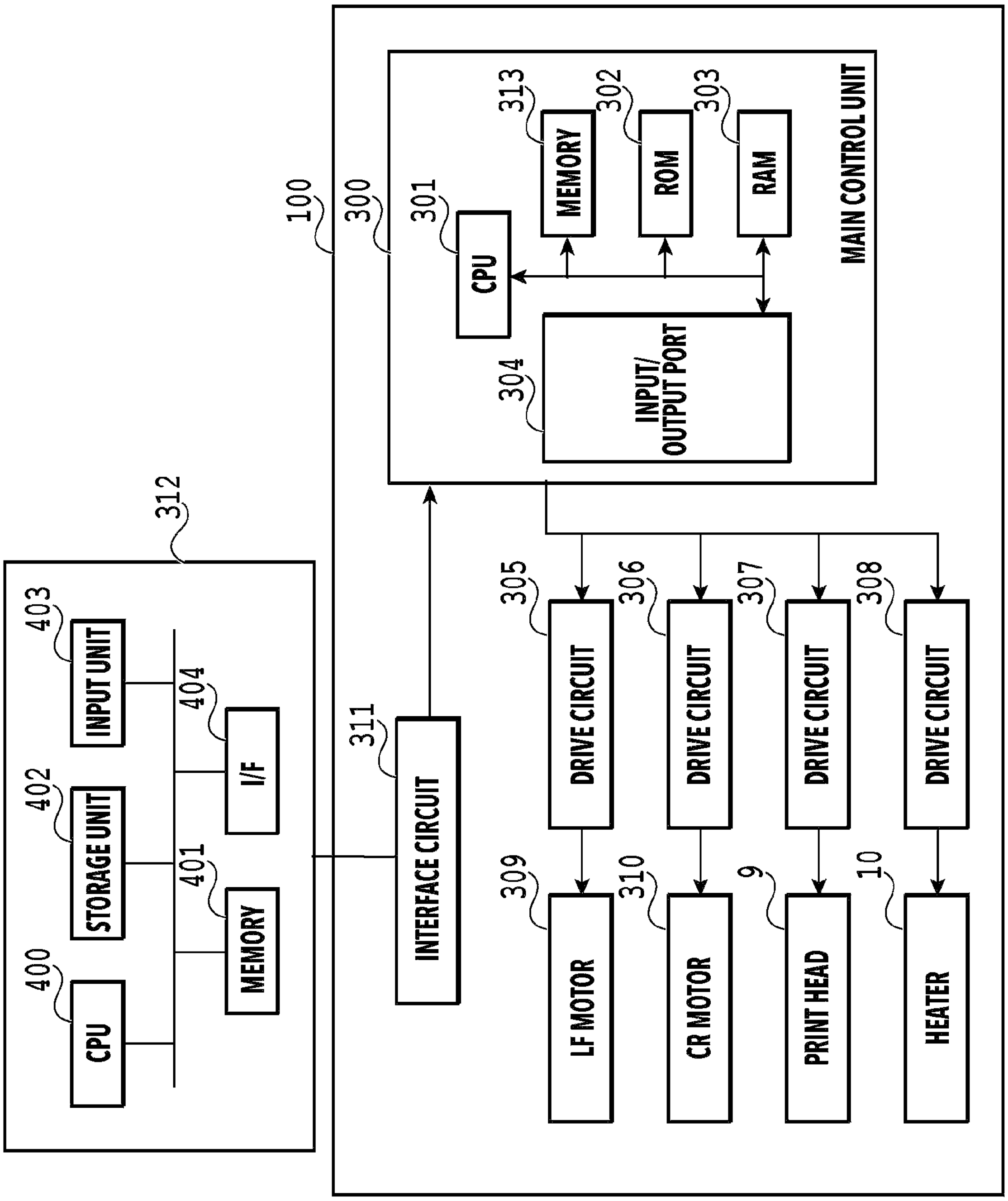
FIG. 4 is a block diagram showing a schematic configuration of a printing system.

FIG. 4 is a block diagram showing a schematic configuration of a printing system including a host apparatus 312 and a control system in the printing apparatus 100 in the present embodiment. The host apparatus 312 is an information processing apparatus connected to the printing apparatus 100, such as a personal computer or a digital camera. The host apparatus 312 includes a CPU 400, a memory 401, a storage unit 402, an input unit 403 such as a keyboard or a mouse, and an interface 404 for communications with the printing apparatus 100. The CPU 400 executes various kinds of processing according to programs stored in the memory 401. These programs are supplied from an external device such as a CD-ROM to store them in the storage unit 402. The programs may be prestored in the storage unit 402.

The host apparatus 312 is connected to the printing apparatus 100 via the interface 404 and sends the printing apparatus 100 image processing information including image data expressed by R, G, and B in an image processing step to be described later and a table used in image processing after that (print control information). Based on the image processing information transmitted thereto, the printing apparatus 100 executes, e.g., color processing, image processing such as binaralizing processing, and correction processing for printing properties to be described later. Note that the host apparatus 312 may execute at least one of the color processing, the image processing, and the correction processing.

The printing apparatus 100 has a main control unit 300. The main control unit 300 includes a CPU 301 that executes printing operation and processing operation such as computation, selection, determination, and control. The main control unit 300 also includes, e.g., a ROM 302 that stores, e.g., control programs to be executed by the CPU 301, a RAM 303 used as, e.g., a buffer for print data, and an input/output port 304. In a memory 313, mask patterns to be described later and the like are stored. Connected to the input/output port 304 are drive circuits 305, 306, 307, and 308 such as actuators in a conveyance motor (LF motor) 309, a carriage motor (CR motor) 310, the print head 9, and the heater 10. The main control unit 300 is connected to the host apparatus 312 via an interface circuit 311.

(4) Multi-Pass Printing Method

In the present embodiment, an image is printed by what is called multi-pass printing, in which printing of a predetermined region on a print medium is performed by a plurality of scans. The printing apparatus 100 of the present embodiment is a printer having a first nozzle array and a second nozzle array each having ejection ports configured to eject an ink of a predetermined color and arranged in the sub scanning direction. Then, the first nozzle array and the second nozzle array are scanned in the main scanning direction intersecting with the sub scanning direction N times (where N is an integer of 2 or greater) to print an image in a predetermined region on a print medium. Such printing with N scans is called multi-pass printing. The following describes typical multi-pass printing.

Figure 5:
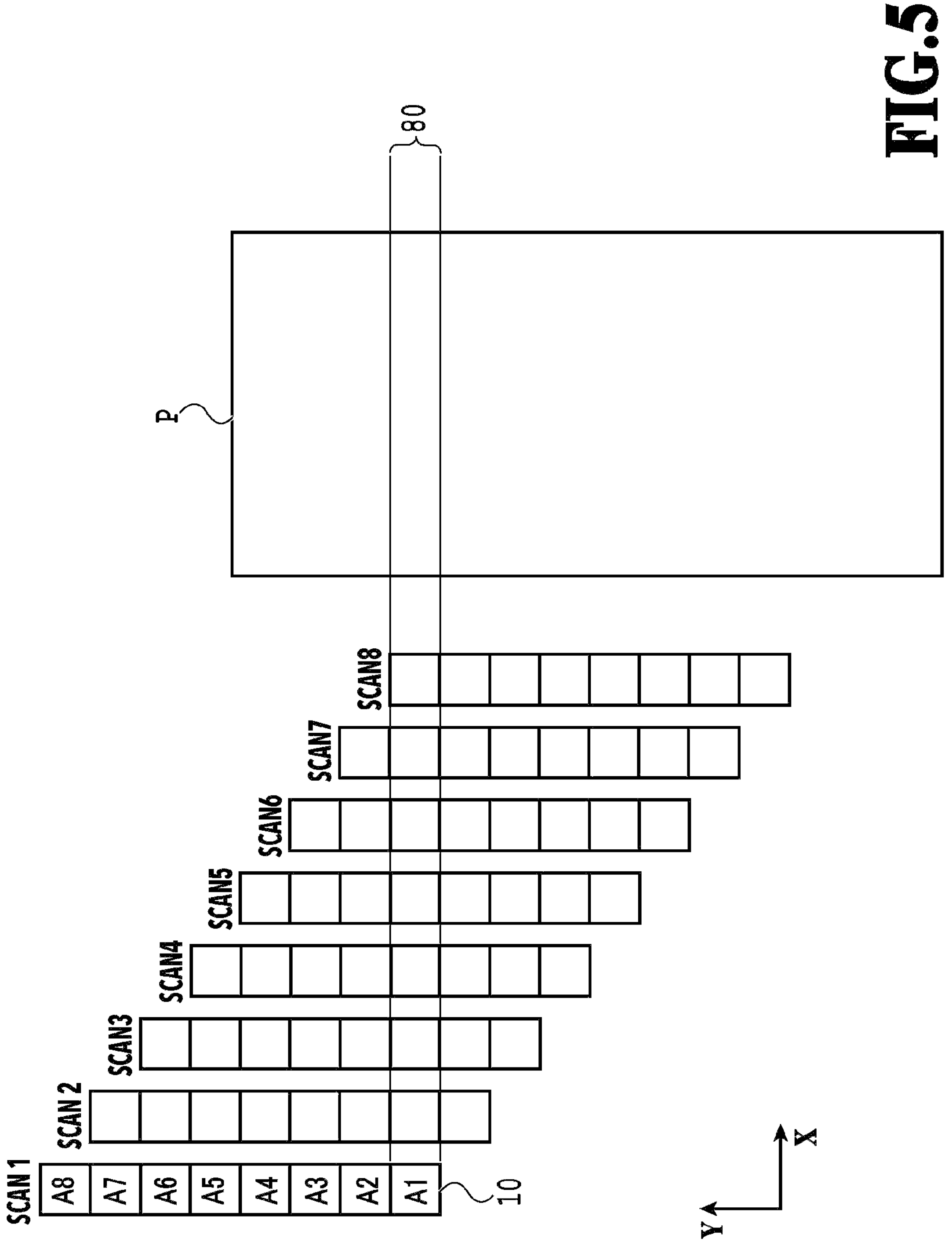
FIG. 5 is a diagram illustrating a multi-pass printing method.

FIG. 5 is a diagram illustrating a typical multi-pass printing method. In an example described here, each nozzle array 90 is divided in the Y-direction to form eight ejection port groups A1 to A8, from each of which an ink is ejected in a corresponding one of eight scans for a predetermined region to print an image in the predetermined region. In other words, FIG. 5 shows an example of what is called eight-pass printing, in which printing of an image in a predetermined region is completed by eight print scans. Although the print medium P is actually conveyed downstream in the Y-direction between scans of the print head 9, FIG. 5 depicts that the print head 9 is moved upstream in the Y-direction between scans to facilitate understanding.

First, in the first scan (Scan 1), the print head 9 is scanned under a positional relation such that a predetermined region 80 on the print medium P and the ejection port group A1 of the nozzle array 90 face each other. Meanwhile, an ink is ejected from the ejection port group A1 to the predetermined region 80 according to printing data corresponding to the ink of each type and corresponding to the first scan. After Scan 1, the print medium is conveyed in the Y-direction by a distance corresponding to one ejection port group. After that, the second scan (Scan 2) is performed, ejecting an ink from the ejection port group A2 to the predetermined region 80 according to printing data corresponding to the ink of each type and corresponding to the second scan.

After that, the conveyance of the print medium P and the ejection from the print head 9 are performed alternately to execute ejection from the ejection port groups A3 to A8 to the predetermined region 80 in the third to eighth scans. Multi-pass printing on the predetermined region 80 is thus completed.

(5) Image Data Conversion Processing

Figure 6:
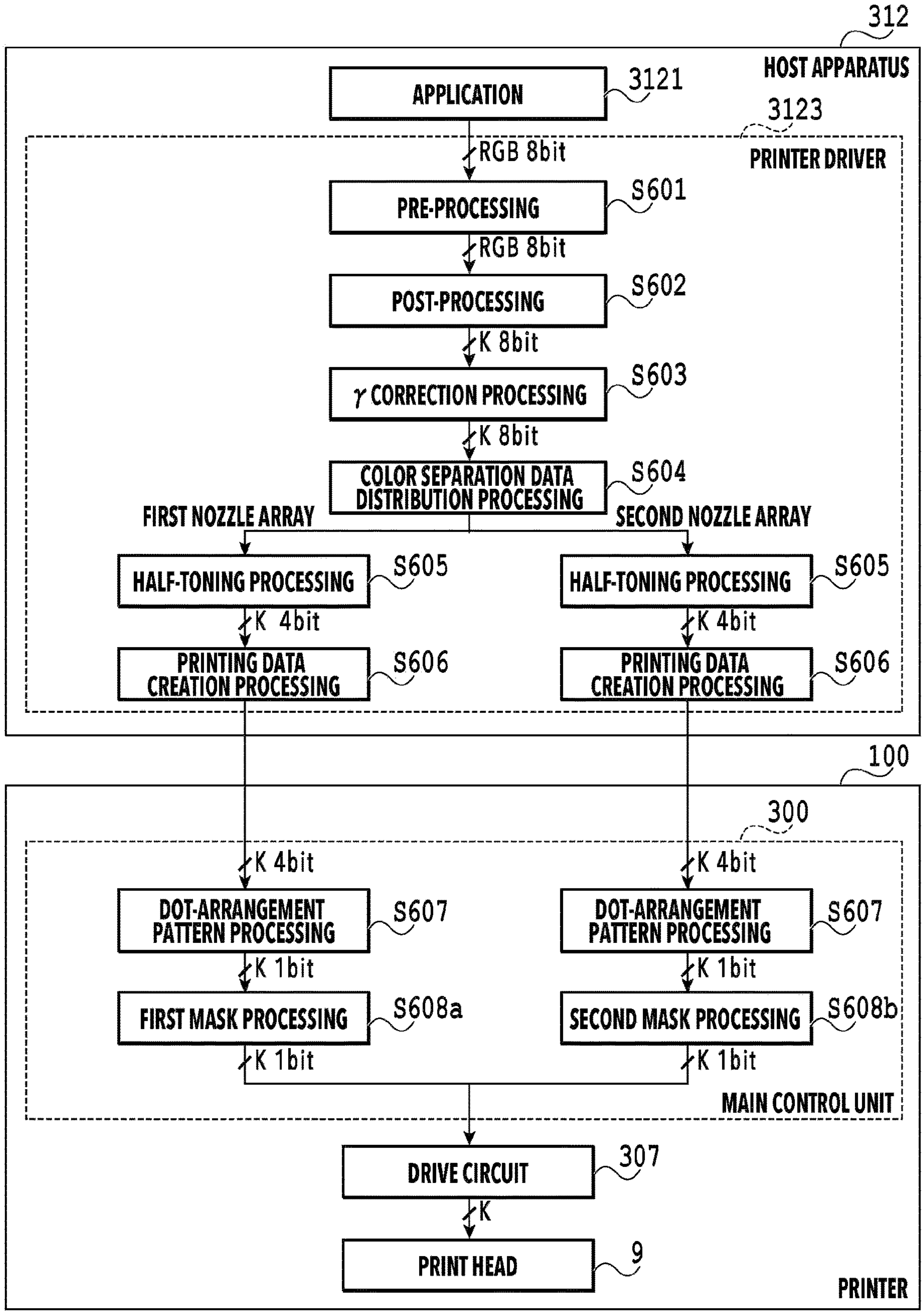
FIG. 6 is a diagram illustrating the flow of image data conversion processing in the printing system.

FIG. 6 is a diagram illustrating the flow of image data conversion processing performed by the printing system of the present embodiment. As described earlier, the printing system of the present embodiment has the host apparatus 312 and the printing apparatus 100. In the present embodiment, the host apparatus 312 performs, e.g., generation of image data indicating an image to be printed and setting of a user interface (UI) for the data generation. The printing apparatus 100 performs printing using ink based on data sent from the host apparatus 312.

FIG. 6 shows processing executed by an application 3121 and a printer driver 3123 in the host apparatus 312 and processing performed by the main control unit 300 in the printing apparatus 100. The processing executed by the application 3121 and the printer driver 3123 is implemented by the CPU 400 of the host apparatus 312 by executing programs stored in the storage unit 402, the memory 401, or the like. Also, the processing executed by the main control unit 300 of the printing apparatus 100 is implemented by the CPU 301 of the main control unit 300 by executing programs stored in the ROM 302, the memory 313, or the like. Some or all of the functions of the steps in FIG. 6 may be implemented by hardware such as an ASIC or an electronic circuit. Note that the letter "S" in the description of the processing means that it is a step (this applies to the other processing herein).

To execute printing, image data created by the application 3121 is passed to the printer driver 3123 via an OS. With respect to the image data received, the printer driver 3123 executes pre-processing S601, post-processing S602, γ correction processing S603, color separation data distribution processing S604, half-toning processing S605, and printing data creation processing S606. The following gives a brief description of each processing.

The pre-processing S601 is processing for performing color gamut mapping. In this processing, data conversion is performed to map a color gamut reproduced by sRGB-standard image data R, G, B to a color gamut reproduced by the printing apparatus 100. Specifically, a three-dimensional lookup table (LUT) is used to convert 256-tone data in which R, G, and B are each expressed with 8 bits, into R, G, B 8-bit data reproducible by the printing apparatus 100.

The post-processing S602 is processing for converting the R, G, B data obtained by the color gamut mapping in the pre-processing S601 into sets of 8-bit color separation data corresponding to a combination of inks to reproduce the color expressed by the data. Here, similarly with the pre-processing S601, the processing is performed using the three-dimensional LUT and interpolation computation together. It goes without saying that the three-dimensional LUT used in the pre-processing S601 and the three-dimensional LUT used in the post-processing S602 are different LUTs. In the configuration in the present embodiment, the print head 9 that ejects a black ink (K) is used as shown in FIG. 3, and thus, a three-dimensional LUT that converts R, G, B data into K data is used.

The γ correction processing S603 is processing for converting density values (tone values) in the color separation data obtained by the post-processing S602 for each color (although there is only K in the present embodiment, a term "each color" is used for the sake of illustration convenience). Specifically, using a one-dimensional LUT corresponding to the tone characteristics of each color ink used in the printing apparatus 100, conversion is performed such that the color separation data is linearly associated with the tone characteristics of the printing apparatus 100.

In the present embodiment, after the density values (tone values) in the color separation data obtained in the post-processing S602 for each color are converted in the γ correction processing S603, the color separation data is distributed to the first nozzle array and the second nozzle array. In other words, the color separation data distribution processing S604 is performed to distribute the color separation data after the γ correction processing into color separation data for the first nozzle array and color separation data for the second nozzle array. Details of the color separation data distribution processing will be described later.

The half-toning processing S605 is processing for performing quantization processing on the color separation data for the first nozzle array and color separation data for the second nozzle array to convert the 8-bit color separation data into 4-bit data. In the present embodiment, ordered dithering is used to convert 256-tone 8-bit data and generate 9-tone 4-bit data. This 4-bit data is tone-value information indicating one of tones from level 0 to level 8 which are indices for indicating dot arrangement pattern in dot arrangement pattern processing S607, which is processing performed by the printing apparatus 100.

The printing data creation processing S606 is processing for creating printing data by adding printing control information to printing image information which is a collection of pieces of tone-value information. The printing control information is, e.g., the grade of a printed image, the type of print medium, and printing information such as color or monochrome. In the printing data creation processing S606, printing data for the first nozzle array and printing data for the second nozzle array are created.

Once the host apparatus 312 sends printing data to the printing apparatus 100, the printing apparatus 100 performs the dot arrangement pattern processing S607 and mask processing S608 on each of the printing data for the first nozzle array and the printing data for the second nozzle array inputted.

In the dot arrangement pattern processing S607, binarization processing is performed by expanding the tone-value information, which is 9-tone 4-bit data that are output values from the half-toning processing S605, to a dot arrangement pattern. As a result, binary data indicating whether to print an ink droplet (ejection or non-ejection) can be obtained for a region corresponding to one multi-value pixel. Here, data on one multilevel (4-bit) pixel (hereinafter called a pixel region) is converted to generate binary (1-bit) 2×4 pixel data.

The mask processing S608 is processing for performing a logical AND between the dot arrangement of each color determined in the dot arrangement pattern processing S607 and a plurality of mask patterns having a mutually complementary relation. As a result, for each color, data for ejecting ink droplets in each of print scans forming multi-pass printing is generated. In the present embodiment, mask processing performed on the data for the first nozzle array is described as first mask processing S608*a*, and mask processing performed on the data for the second nozzle array is described as second mask processing S608*b*. In the present embodiment, as will be described later, in the processing, a first mask to be described later is allocated to the first nozzle array, and a second mask to be described later is allocated to the second nozzle array.

The main control unit 300 transfers the binary printing data obtained as a result of the mask processing S608 to the head drive circuit 307. The 1-bit data on each color inputted to the drive circuit 307 is converted to a drive pulse for the print head 9, so that an ink is ejected at an appropriate timing in a plurality of print scans in multi-pass printing. Consequently, ink ejection is performed according to the printing data, and an image is printed on the print medium. Although the processing performed by the printer driver 3123 and the processing performed by the main control unit 300 of the printing apparatus 100 are described as being separate in the example in FIG. 6, this description is merely an example. Some or all of the processes in FIG. 6 may be performed by the printer driver 3123 or by the main control unit 300. In other words, the printing control apparatus that controls the printing apparatus 100 may be the host apparatus 312 or may be the printing apparatus 100.

(6) Printing Percentages in Masks

Figure 7A:
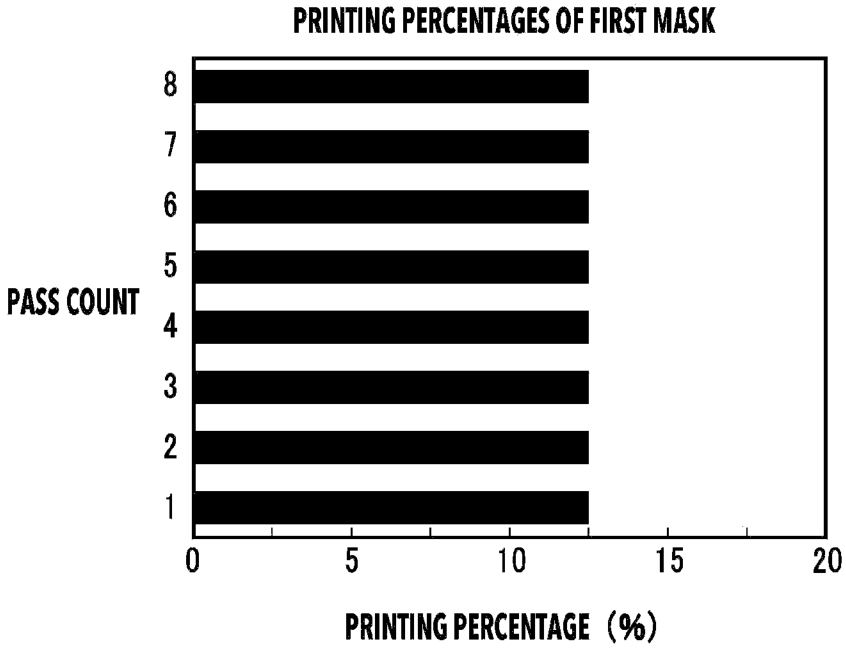
FIGS. 7A and 7B are diagrams illustrating printing percentages of masks.
Figure 7B:
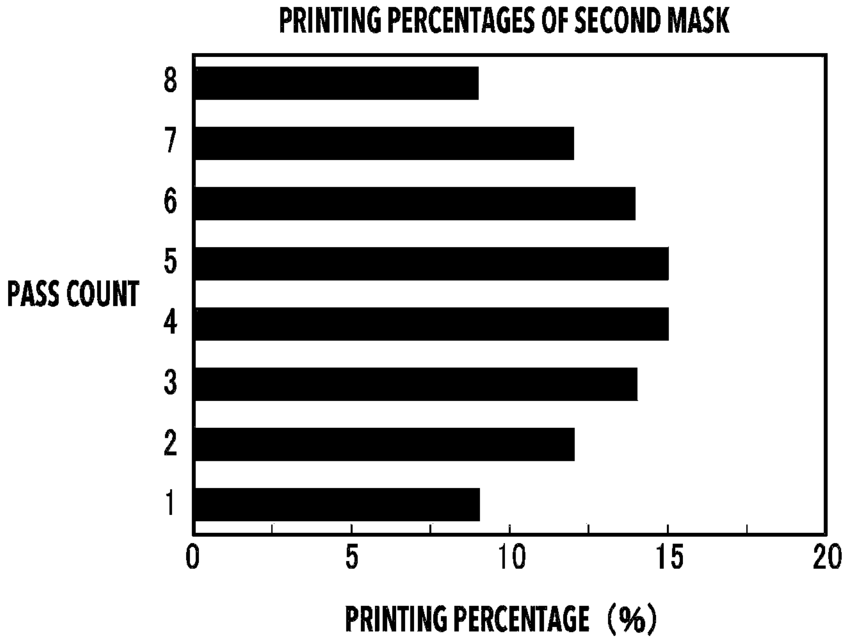

FIGS. 7A and 7B are diagrams illustrating printing percentages (ink ejection percentages) in masks. FIG. 7A is a diagram showing the printing percentages (printing ratio) of the respective passes for the first mask. Such printing percentages can be set by mask patterns for allotting printing data corresponding to a pixel to the respective passes. A mask pattern is formed by mask elements each defines output or non-output of printing data. Through mask processing using mask patterns, printing data corresponding to ink ejection or non-ejection is allotted to each pass. A "printing percentage" also represents the proportion of mask elements defining output of printing data. In the present embodiment, what is used in mask processing to use printing data in each pass is referred to as a "mask pattern," and these mask patterns are collectively called a "mask."

For example, the first mask shown in FIG. 7A shows mask patterns that complete multi-pass printing with eight passes. The first mask includes mask patterns such that the printing percentage is constant among the passes forming multi-pass printing, namely the first to eighth passes (the printing percentage of each pass is 12.5% in this example). Using the first mask, printing data on a corresponding ink is allotted to the first to eight passes with the print percentages shown in FIG. 7A. Also, the eight mask patterns used in the first to eight passes have a mutually complementary relation, and their printing percentages add up to 100%.

Note that the printing percentage 100% in the present embodiment refers to a state where an area factor is filled 100%. Specifically, in a case where the resolution on a paper surface is 600 dpi and the diameter of a landed dot is approximately 30 μm, the printing percentage 100% in the present embodiment is a state where an area factor is filled 100% by forming a total of four dots on a 600 dpi grid (the area of 42.3 μm×42.3 μm).

FIG. 7B shows the printing percentages of the respective passes for the second mask. Like the first mask, the second mask includes eight mask patterns corresponding to the first to eighth passes. While the first mask has a constant printing percentage among the first to eighth passes, the second mask includes mask patterns such that the printing percentages of the intermediate print passes are high relative to those of the earlier print passes and later print passes. In the second mask as well, the eight mask patterns have a mutually complementary relation, and their printing percentages add up to 100%. Thus, the first mask and the second mask each define printing percentages for a single nozzle array.

Note that in the present embodiment, color separation data on an ink color is distributed into data for the first nozzle array and data for the second nozzle array. Thus, a printing duty (the proportion of an ink of a certain ink color being ejected) printed by each pass for each nozzle array is found based on the relation between the ratio of distribution of the color separation data and a printing percentage. For example, in a case where the distribution ratio of distribution between the first nozzle array (the first mask) and the second nozzle array (the second mask) is 50%:50%, the printing duty of the color separation data on each pass in the first mask is 6.25%.

In this way, in the present embodiment, the first mask used for the first nozzle array and the second mask used for the second nozzle array include mask patterns having different printing percentages of the passes from each other. Specifically, the first mask includes mask patterns such that the printing percentage is constant among the passes, whereas the second mask includes mask patterns such that the printing percentages of the intermediate print passes are high relative to those of the earlier and later printing passes.

Each mask can also be said to have a shape having the characteristics as shown in FIG. 7A or 7B. As an example, consider a mask pattern in which a position at which a dot is to be printed is black and a position at which a dot is not to be printed is white. In this case, the first mask corresponding to a predetermined print region (a unit region) has a mask shape such that black dots are evenly distributed over the entire unit area. Meanwhile, the second mask corresponding to the predetermined print region (a unit region) has a mask shape such that black dots are concentrated in a center portion of the unit region and scattered in upper and lower end portions of the unit region. In the present embodiment, such masks are allocated to the first nozzle array and the second nozzle array in a fixed manner.

(7) Principle of Color Separation

Figure 8A:
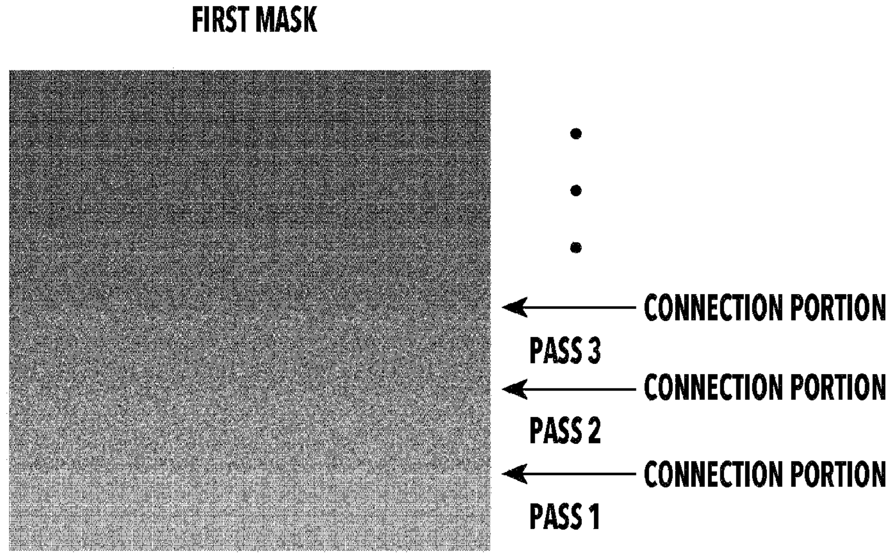
FIGS. 8A and 8B are diagrams showing how the way streaks at connection portions in the pass formation process look different.
Figure 8B:
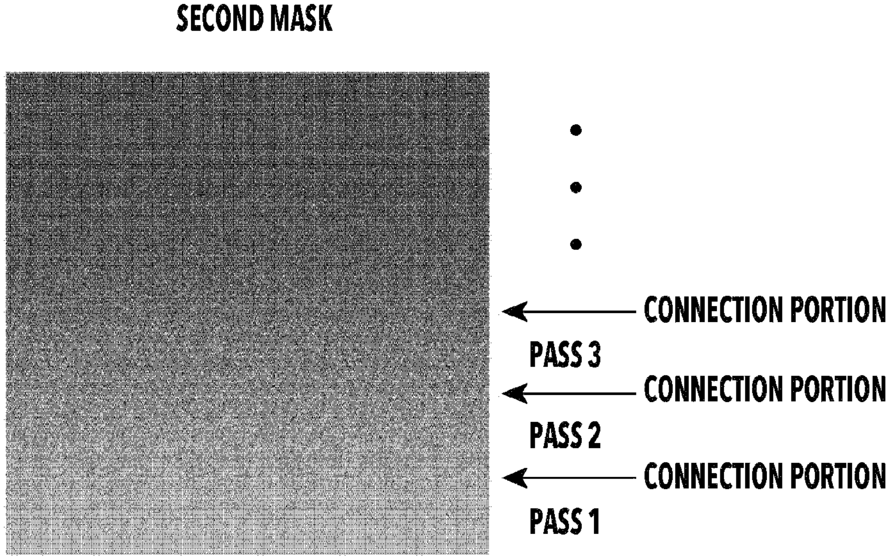

FIGS. 8A and 8B are diagrams showing how the way streaks at connection portions in the pass formation process look different between the mask shape of the first mask (hereinafter referred to as a first mask shape) and the mask shape of the second mask (hereinafter referred to as a second mask shape). In the case described here, the first mask is allocated to the first nozzle array, and the second mask is allocated to the second nozzle array. FIG. 8A is an example where the first mask is allocated, and FIG. 8B is an example where the second mask is allocated. As shown in FIG. 8A, in the case where the first mask is allocated, an abrupt change in density is generated at a connection portion between passes and is easily visible as a streak. Meanwhile, as shown in FIG. 8B, in the case where the second mask is allocated, a change in density at the connection portion is gradual, and unevenness in density at a connection portion between passes is reduced. As a result, a streak is less likely to be visible. However, in the second mask, the higher the printing duty (the higher the tone value in the color separation data), the more likely it is that lightness becomes uneven within a band according to the slope of the second mask shape.

In the present embodiment, in a case where a printing duty is a predetermined value or below, the color separation data is distributed into data for ejecting an ink from the first nozzle array of the print head and data for ejecting an ink from the second nozzle array of the print head so that a proportion of the color separation data distributed to the second nozzle array may be higher than that distributed to the first nozzle array. The predetermined value is, for example, 50%. By thus distributing the color separation data (printing duty), connection streaks are reduced. Meanwhile, in a case where the printing duty is higher than the predetermined value, the data is distributed as follows. Specifically, the color separation data is distributed into data for ejecting an ink from the first nozzle array of the print head and data for ejecting an ink from the second nozzle array of the print head so that a proportion of the color separation data distributed to the second nozzle array may be higher than or the same as that distributed to the first nozzle array. By thus distributing the printing duty, lightness is less likely to become uneven within a band.

(8) Method for Distributing Color Separation Data Based on Tone Values in Input Data FIG. 9 is a diagram illustrating a method in which 256-tone values from "0" to "255" in input data inputted after completion of the γ correction processing S603 are allotted to the first nozzle array and the second nozzle array in the color separation data distribution processing S604.

The printing duty (the proportion of an ink of a certain ink color being ejected) is 0% in a case where a tone value in color separation data (input data) is "0" and is 100% in a case where a tone value is "255." As an example, a case is considered here in which, for a tone value "255," a tone value "128" is allotted to the first nozzle array, and a tone value "128" is allotted to the second nozzle array. In this case, the color separation data is distributed and allotted to the first nozzle array at a distribution ratio of 50% and to the second nozzle array at a distribution ratio of 50%. In a case where the input data indicates a tone value "128," a tone value "32" is allotted to the first nozzle array, and a tone value "96" is allotted to the second nozzle array. Then, the total printing duty becomes 50%, with the first nozzle array being allocated a printing duty of 12.5% and the second nozzle array being allocated a printing duty of 37.5%. In this case, the 50% printing duty is distributed at a distribution ratio of 25% to the first nozzle array and 75% to the second nozzle array.

(9) Specific Method for Distributing Color Separation Data

Figure 10A:
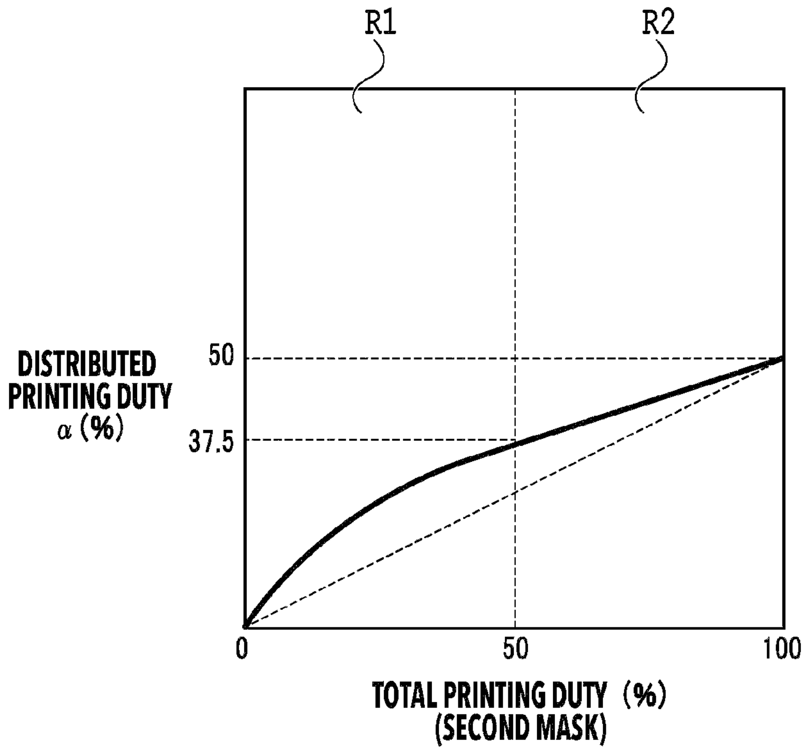
FIGS. 10A and 10B are diagrams illustrating a specific method of distributing color separation data.
Figure 10B:
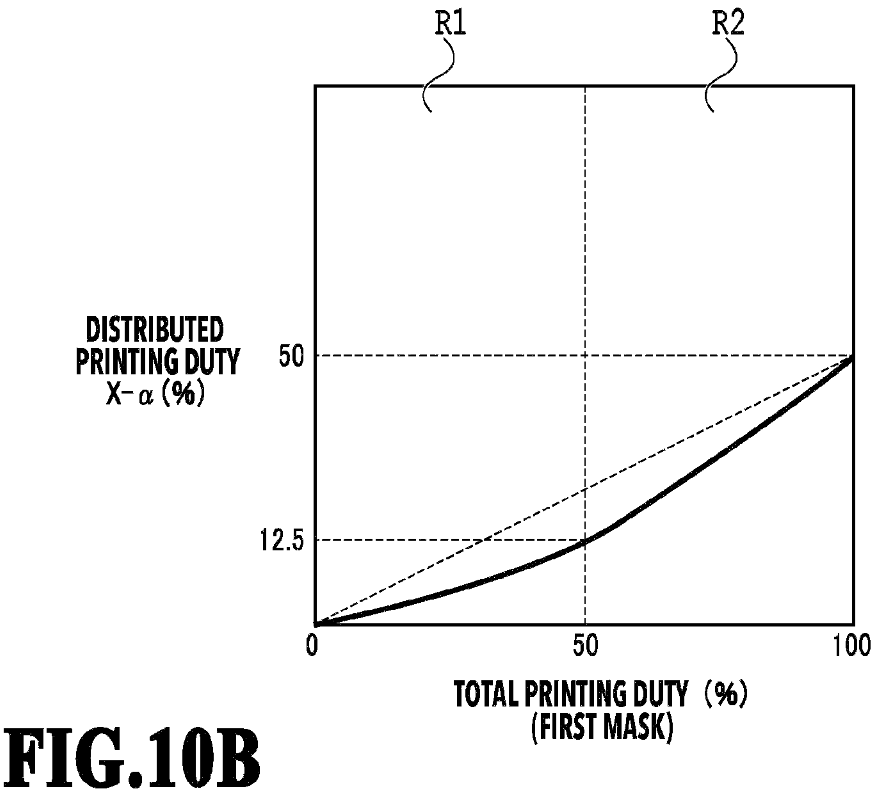

FIGS. 10A and 10B are diagrams illustrating a specific method for distributing color separation data, or in other words, a specific method for distributing a printing duty. A total printing duty for the same ink color is defined as X (%). FIG. 10A is an example of how a printing duty is distributed to the second mask (i.e., the second nozzle array), and FIG. 10B is an example of how a printing duty is distributed to the first mask (i.e., the first nozzle array). The horizontal axis in FIGS. 10A and 10B indicates the total printing duty of a printing duty for the first nozzle array (for the first mask) and a printing duty for the second nozzle array (for the second mask). Specifically, a total printing duty of 50% indicates that input data has a tone value of "128". The vertical axis in FIGS. 10A and 10B indicates a distributed printing duty. A distributed printing duty is a printing duty after distribution.

As shown in FIG. 10A, a distributed printing duty for the second mask is expressed as α % with X changing from 0% from 100%. Also, as shown in FIG. 10B, a distributed printing duty for the first mask is expressed as (X−α)%. Color separation data (i.e., the total printing duty) is distributed to the first nozzle array and the second nozzle array according to these distributed printing duties.

In FIGS. 10A and 10B, a region R1 indicates a first printing duty region where the total printing duty is relatively low, and a region R2 indicates a second printing duty region where the total printing duty is relatively high. As shown in FIGS. 10A and 10B, in a case where, for example, the total printing duty for the same color is 50%, color separation data is distributed so that α may be 37.5% and X−α may be 12.5%. Also, in a case where the total printing duty for the same color is 100%, color separation data is distributed so that a may be 50% and X−α may be 50%. These percentages are the same as those described in the example in FIG. 9. Thus, FIGS. 10A and 10B show graph data visualizing the example shown in FIG. 9.

In this way, for a relatively low tone (the first printing duty region R1), color separation data is distributed so that the distributed printing duty for the second nozzle array may be higher than the distributed printing duty for the first nozzle array. By contrast, for a relatively high tone (the second printing duty region R2), color separation data is distributed so that the distributed printing duty for the second nozzle array may be higher than or the same as the distributed printing duty for the first nozzle array.

(10) Method for Processing Pass Data

Figure 11A:
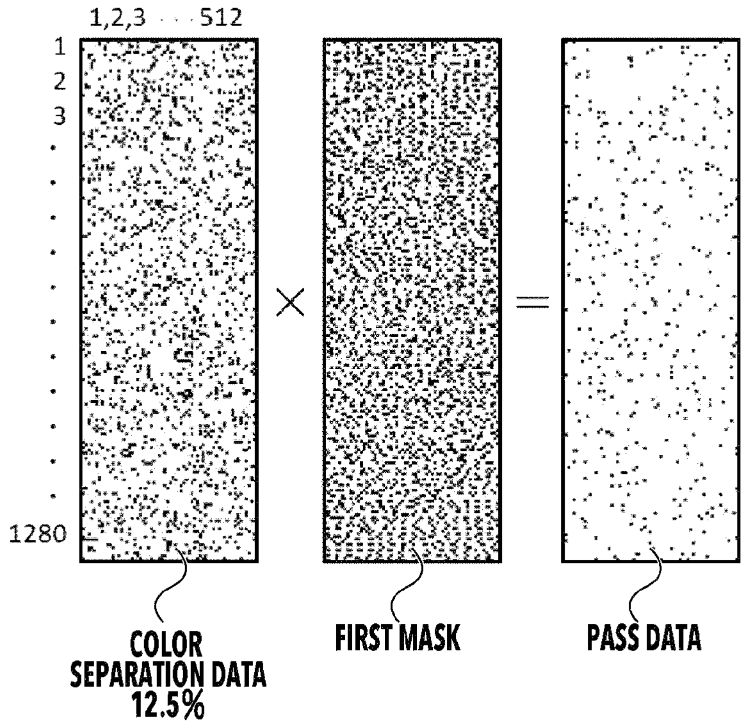
FIGS. 11A and 11B are diagrams illustrating pass data processing method.
Figure 11B:
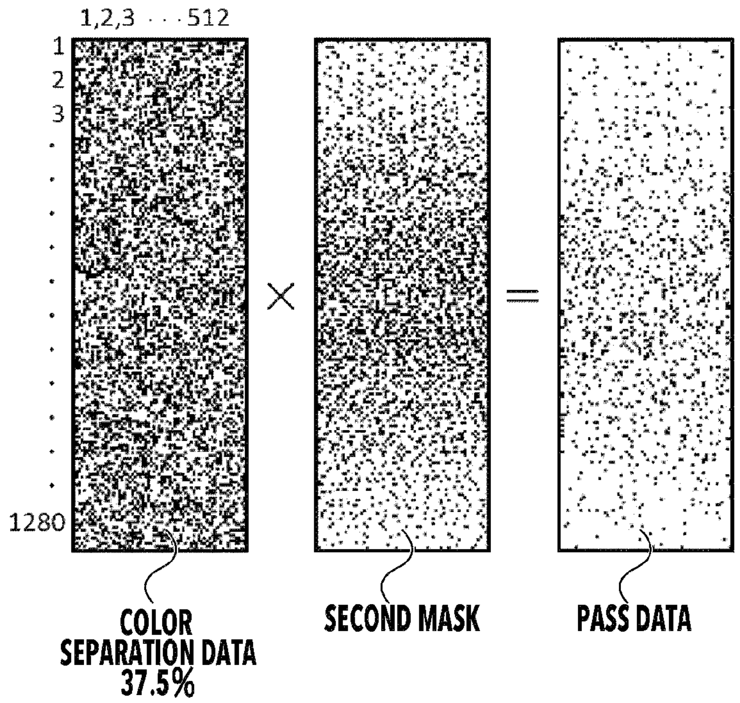

FIGS. 11A and 11B are diagrams illustrating a method for processing pass data for each printing element group. Pass data is data after mask processing. Pass data for each of the first nozzle array and the second nozzle array is obtained by performing a logical AND between color separation data distributed to the first or second nozzle array and the first or second mask shape, or specifically, obtained by performing the following processing:

pass data for the first nozzle array=color separation data $(X-\alpha)\%\times$the first mask, and pass data for the second nozzle array=color separation data $\alpha$ %×the second mask. Here, "×" indicates performing a logical AND.

FIG. 11A is a diagram illustrating how pass data is created in a case where the total printing duty is 50% like in FIGS. 10A and 10B. FIG. 11A shows, from the left, color separation data (($(X-\alpha)\%$)) for the first nozzle array on a predetermined unit region (1280 pixels vertically×512 pixels horizontally), the first mask shape, and pass data. In other words, FIG. 11A schematically shows that the pass data is a result of a logical AND between the color separation data and the first mask. Similarly, FIG. 11B shows, from the left, color separation data ($\alpha$ %) for the second nozzle array on the predetermined unit region, the second mask shape, and pass data.

(11) Pass Data Generation Processing

Figure 12:
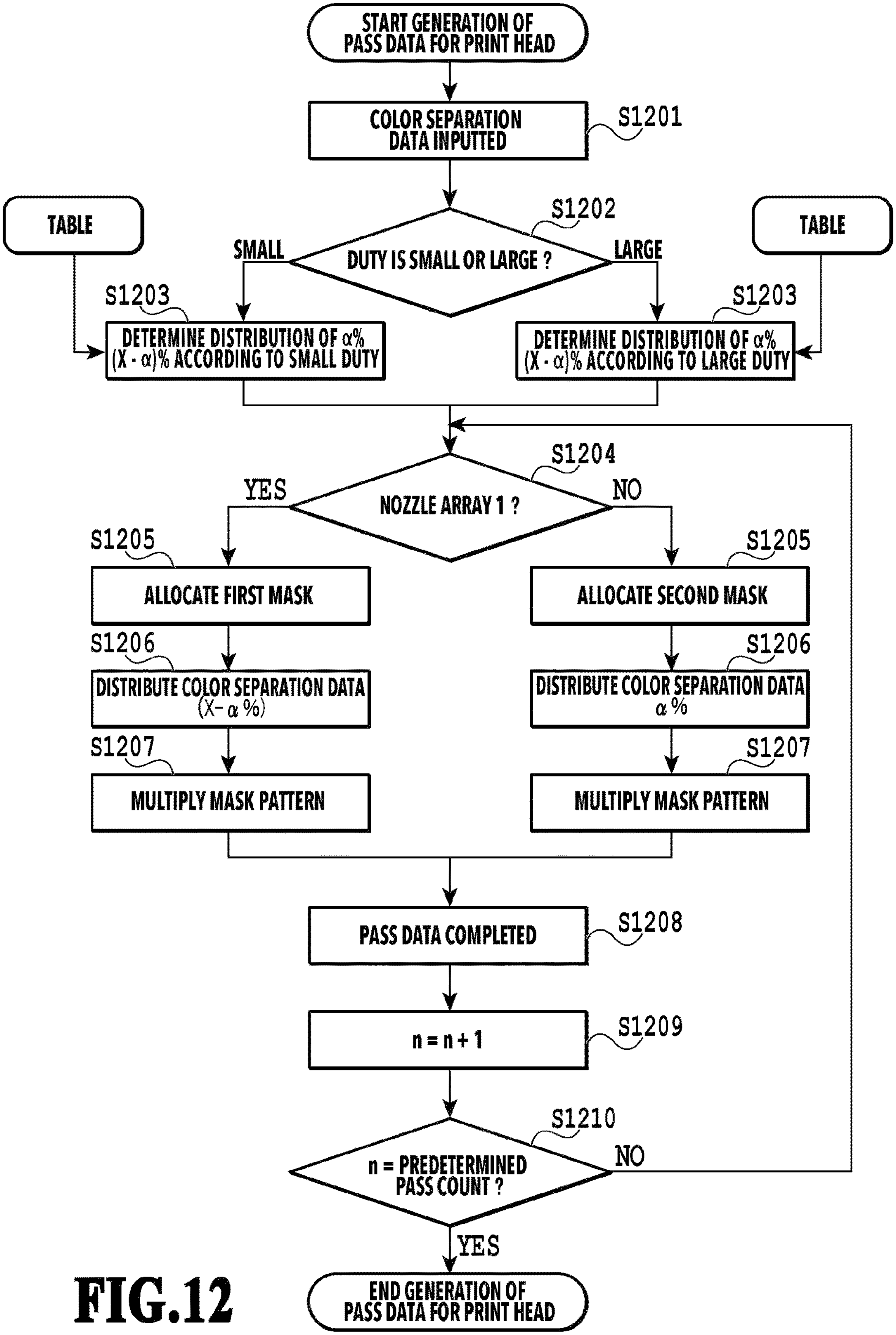
FIG. 12 is a flowchart showing pass data generation processing.

FIG. 12 is a flowchart showing pass data generation processing in the present embodiment. The processing in FIG. 12 corresponds to a series of processing from the color separation data distribution processing S604 to the mask processing S608 described with FIG. 6. Note that FIG. 12 is a flowchart mainly focusing on the color separation data distribution processing S604 and the mask processing S608 and omits descriptions of the other processing. Also, to make the description simple, the following processing is described as being performed by the main control unit 300.

Once color separation data is inputted in S1201, in S1202, the main control unit 300 determines a total printing duty. Specifically, the main control unit 300 determines whether the total printing duty is larger than a predetermined value. This determines whether the total printing duty is, for example, a value in the first printing duty region R1 or a value in the second printing duty region R2 in FIGS. 10A and 10B. The total printing duty corresponds to a tone value in the input data.

In S1203, the main control unit 300 determines how to distribute the color separation data according to the total printing duty. Specifically, with reference to a table having relations as shown in FIGS. 10A and 10B, the main control unit 300 determines distributed printing duties $\alpha$ % and $(X-\alpha)\%$ corresponding to the total printing duty. For example, in a case where the total printing duty is small, distributed printing duties are determined with reference to values for the first printing duty region R1 in FIGS. 10A and 10B. In a case where the total printing duty is large, distributed printing duties are determined with reference to values for the second printing duty region R2 in FIGS. 10A and 10B.

The subsequent processing in and after S1204 is processing for determining data on each pass (pass data). In S1204, the main control unit 300 determines whether data to be processed is data for the first nozzle array or data for the second nozzle array. Then, in S1205, the main control unit 300 allocates the first mask to the data for the first nozzle array and allocates the second mask to the data for the second nozzle array.

Next, in S1206, the main control unit 300 distributes $(X-\alpha)\%$ of the color separation data to the first nozzle array and $\alpha$ % of the color separation data to the second nozzle array according to the distribution determined in S1203. Next, in S1207, the main control unit 300 performs mask processing of multiplying the color separation data and the mask patterns in FIGS. 7A and 7B to perform a logical AND therebetween. As a result, pass data to be printed by each nozzle array of the print head during a scan of the processing target is completed (S1208). The pass data is transferred to the print head 9 at an appropriate timing to perform printing.

In S1209, a variable n as the number of scans is incremented by 1, and the main control unit 300 determines whether the value of n has reached a predetermined pass count (S1210). If the value is the predetermined pass count, the main control unit 300 determines that the generation of pass data for scans of the print head has been finished and ends the processing. If the value is below the predetermined pass count, the main control unit 300 proceeds back to S1204 to repeat the printing data generation processing from S1204 until the predetermined pass count is reached.

As thus described, in the present embodiment, the first mask is allocated for the first nozzle array, and the second mask which is a different from the first mask is allocated for the second nozzle array. These first and second masks allocated for the respective nozzle arrays do not vary among the scans, and fixed masks are used. Meanwhile, the distribution ratio of sets of data distributed to the respective nozzle arrays is controlled according to the total printing duty (i.e., a tone value in data after color separation). This can reduce unevenness in density at a connection portion and reduce unevenness in lightness within a band. Note that as to the printing duty distribution method, although the distribution is performed with reference to information held by a table as shown in FIGS. 10A and 10B, the distribution method may instead be determined using a predetermined formula.

Second Embodiment

In the first embodiment, an example of using one type of ink has been described. In the present embodiment, an example of using a plurality of types of ink is described. Note that the following omits descriptions of configurations similar to those in the first embodiment and focuses on differences. Also, the subtitles are given the same numbers given to those in the first embodiment.

(2) Configuration of the Print Head

Figure 13:
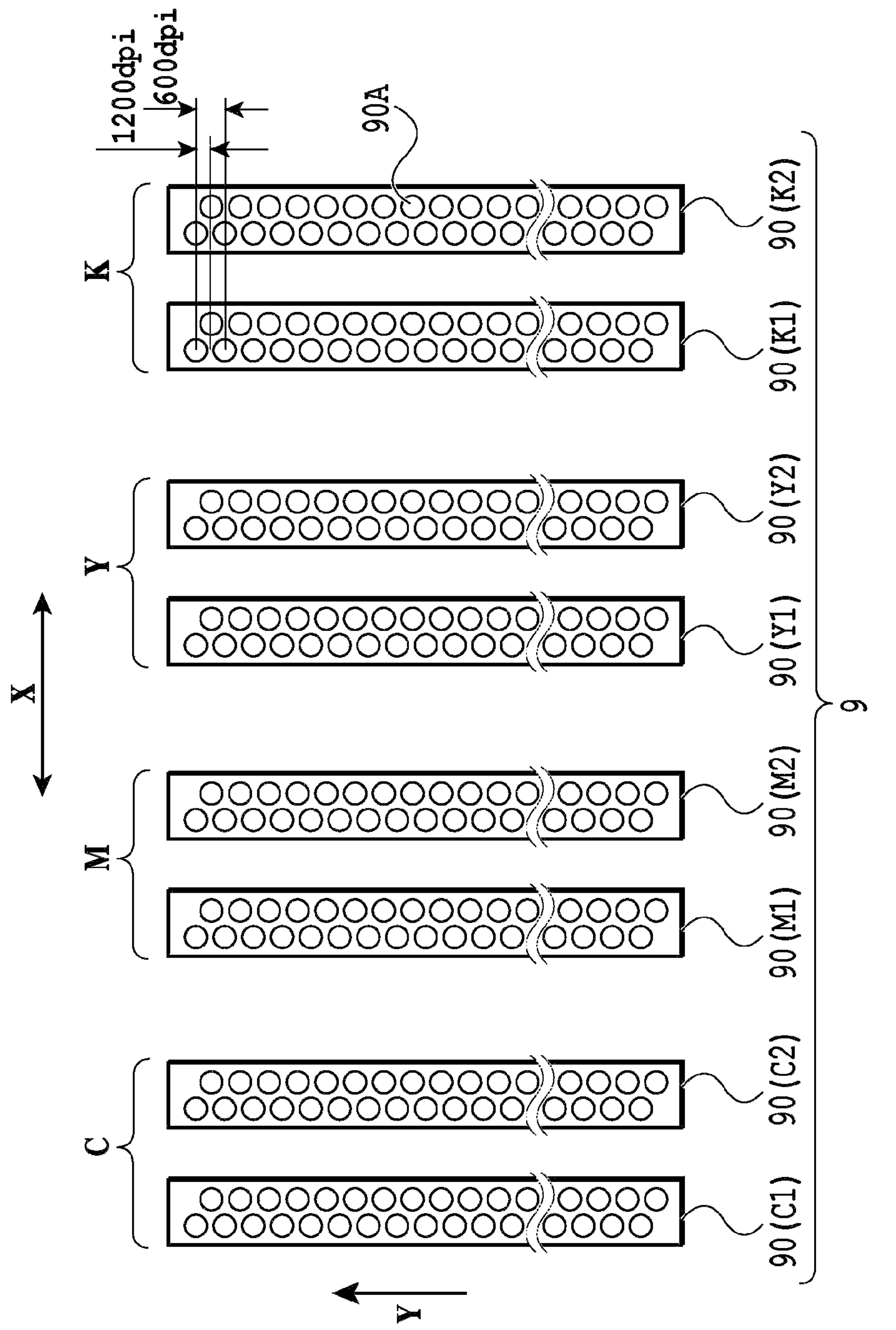
FIG. 13 is a diagram illustrating the configuration of a print head.
Figure 14A:
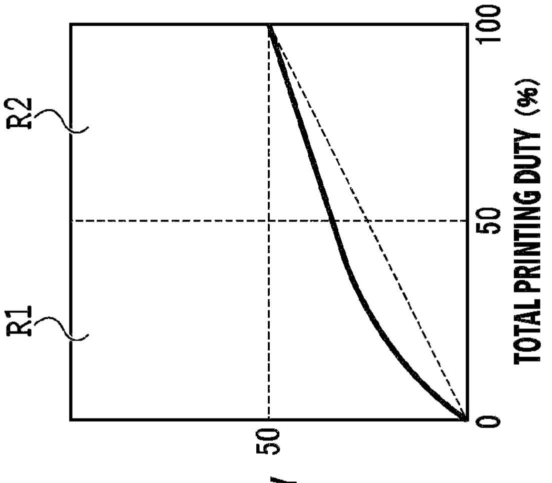
FIGS. 14A to 14D are diagrams illustrating a specific method of distributing color separation data.
Figure 14B:
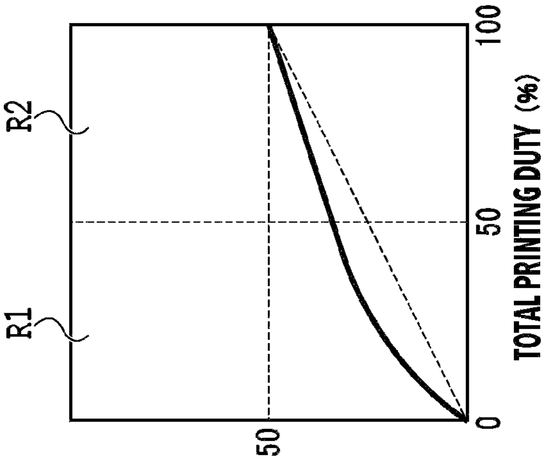
Figure 14C:
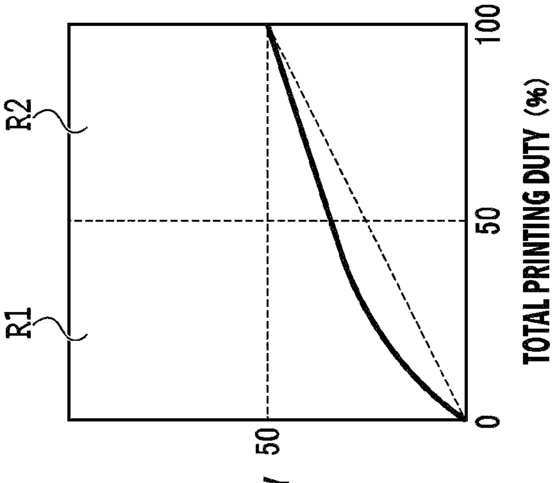
Figure 14D:
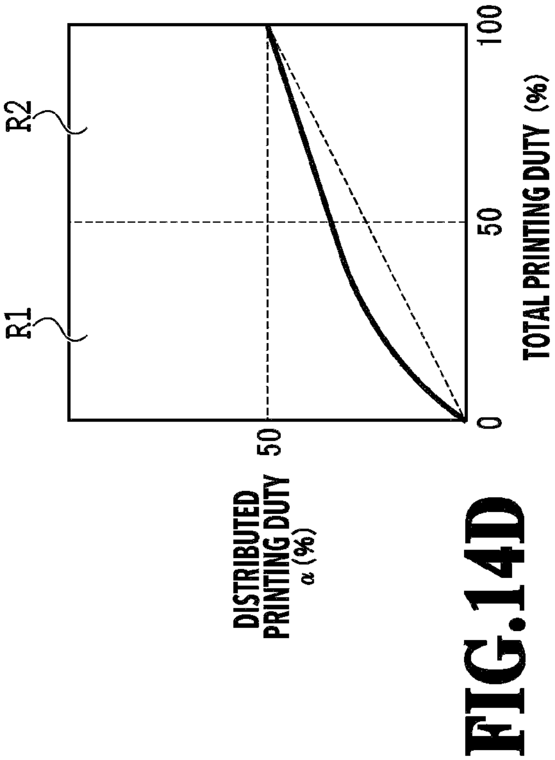

FIG. 13 is a diagram illustrating the configuration of the print head 9 of the present embodiment. As inks containing a color ink, the print head 9 of the present embodiment uses a cyan ink (C), a magenta ink (M), a yellow ink (Y), and a black ink (K). Specifically, the print head 9 includes a plurality of nozzle arrays 90 (C1 and C2, M1 and M2, Y1 and Y2, K1 and K2) for each of these colors. Although the following description uses C, M, Y, and K inks as an example, inks of other colors may be used.

In the print head 9, these ejection port arrays are arranged side by side from the left side to the right side of the X-direction in the order of the ejection port arrays C1, C2, M1, M2, Y1, Y2, K1, and K2. These ejection port arrays C1, C2, M1, M2, Y1, Y2, K1, and K2 are each formed by 1280 ejection ports 90A configured to eject a corresponding ink and arranged in the Y-direction (the arrangement direction) at a density of 1200 dpi. Note that the amount of ink ejected from a single ejection port 90A at once is approximately 4.5 pl in the present embodiment.

These ejection port arrays C1, C2, M1, M2, Y1, Y2, K1, and K2 are connected to ink tanks (not shown) storing corresponding inks and are supplied with the inks. Note that the print head 9 and the ink tanks used in the present embodiment may be configured integrally or configured to be separable from each other.

(5) Image Data Conversion Processing

The present embodiment differs from the first embodiment in that by the post-processing S602, R, G, B data is converted to data on each ink color of C, M, Y, and K. As to processing in and after the γ correction processing S603, except for the color separation data distribution processing S604, processing similar to the processing described in the first embodiment is performed on each of the data on the color ink C, the data on the color ink M, the data on the color ink Y, and the data on the color ink K. Thus, parts denoted as "K" in FIG. 6 only need to be read as "CMYK." The color separation data distribution processing S604 of the present embodiment is described below.

(12) Method for Distributing Color Separation Data

In the present embodiment, for the colors C, M, Y, and K, the first mask is allocated to the first nozzle arrays (C1, M1, Y1, and K1), and the second mask is allocated to the second nozzle arrays (C2, M2, Y2, and K2).

FIGS. 14A to 14D are diagrams illustrating a specific method for distributing color separation data (a total printing duty) in the present embodiment. FIGS. 14A to 14D only show the distributed printing duty α % for the second nozzle arrays of the respective colors. As is similar to the example described in the first embodiment, a total printing duty of each of the colors C, M, Y, and K is defined as X (%), and a distributed printing duty for the second mask for each color is expressed as α % with X changing from 0% from 100%. FIG. 14A to 14D show distributed printing duties of cyan (C), magenta (M), yellow (Y), and black (K), respectively. FIGS. 14A to 14D only show α %, which is a distributed printing duty for the second mask, and omit (X−α)%, which is a distributed printing duty for the first mask, because the same principle as that in the first embodiment applies. Although FIGS. 14A to 14D show a case where α % is the same for all of C, M, Y, and K, α % may be adjusted depending on color. For example, for a hue which is less visually noticeable as a streak after every sheet conveyance (such as yellow), the distributed printing duty for the second mask may be closer to the distributed printing duty for the first mask than the other colors. Conversely, for a hue which is easily visible as a streak (such as cyan, magenta, or black), the distributed printing duty for the second mask may be higher than the distributed printing duty for the first mask to a greater extent.

In the present embodiment, like in the first embodiment, for a relatively low tone (the first printing duty region R1), distribution into data for the first nozzle array and data for the second nozzle array is done so that a distributed printing duty for the second nozzle array may be higher than a distributed printing duty for the first nozzle array. For a relatively high tone (the second printing duty region R2), distribution into data for the first nozzle array and data for the second nozzle array is done so that a distributed printing duty for the second nozzle array may be higher than or the same as a distributed printing duty for the first nozzle array.

As thus described, the present embodiment too can reduce unevenness in density at a connection portion and reduce unevenness in lightness within a band. Also, the present embodiment makes it possible to make fine adjustments according to a hue because the distributed duty is individually determined for each color.

OTHER EMBODIMENTS

In the first and second embodiments, an example where an ink is a color ink is described. However, the present disclosure is not limited to this example. The ink may be a reactive liquid that reacts with a color material ink or may be an overcoat liquid.

In the second embodiment, an example where each of the colors C, M, Y, and K has a plurality of nozzle arrays has been described. In this respect, all the colors used in the print head may have a plurality of nozzles, or some ink colors may have a single nozzle array. In this case, the processing described in each of the above embodiments may be performed on color separation data on an ink color having a plurality of nozzle arrays.

In addition, each of the above embodiments has described an example where a total printing duty is distributed according to distributed printing duties shown in, for example, FIGS. 10A and 10B and FIGS. 14A to 14D. Alternatively, the total printing duty may be distributed according to data that defines a ratio of allotment to the first nozzle array and the second nozzle array (a distribution ratio). For example, in a case where the total printing duty is 50% in the example in FIGS. 10A and 10B, the total printing duty may be distributed according to data (such as a table) defining a distribution ratio such that 75% is allocated to the second mask and 25% is allocated to the first mask. Advantageous effects similar to those offered by the examples described in the above embodiments can still be obtained in this case.

The present disclosure allows easy adjustment of printing duties and printing with less image quality degradation without changing mask patterns.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-185101, filed Nov. 12, 2021, which is hereby incorporated by reference wherein in its entirety.

What is claimed is:

1. A printing control apparatus configured to control a printing apparatus including a first nozzle array having ejection ports configured to eject an ink of a predetermined color and arranged in a sub scanning direction and a second nozzle array having ejection ports configured to eject an ink of the predetermined color and arranged in the sub scanning direction, the printing apparatus printing an image in a predetermined region on a print medium by scanning the first nozzle array and the second nozzle array N times (where N is an integer of 2 or greater) in a main scanning direction intersecting with the sub scanning direction, the printing control apparatus comprising:

a control unit configured to perform control so that a distribution ratio based on which color separation data separated as having the predetermined color is distributed into data for the first nozzle array and a distribution ratio based on which the color separation data is distributed into data for the second nozzle array are different depending on a tone value in the color separation data; and a generation unit configured to generate printing data to be used for printing by the first nozzle array based on the distributed data for the first nozzle array and generate printing data to be used for printing by the second nozzle array based on the distributed data for the second nozzle array.

2. The printing control apparatus according to claim 1, wherein the generation unit generates the printing data for the first nozzle array by allocating a first mask to the distributed data for the first nozzle array and performing mask processing, and the generation unit generates the printing data for the second nozzle array by allocating a second mask different from the first mask to the distributed data for the second nozzle array and performing mask processing.

3. The printing control apparatus according to claim 2, wherein the first mask include mask patterns having an equal printing percentage among scans, and the second mask includes mask patterns such that a printing percentage for an intermediate scan is relatively higher than a printing percentage for an earlier scan and a later scan.

4. The printing control apparatus according to claim 3, wherein in a case where the tone value in the color separation data is the predetermined value or below, the control unit makes the distribution ratio of distribution to the second nozzle array higher than the distribution ratio of distribution to the first nozzle array.

5. The printing control apparatus according to claim 3, wherein in a case where the tone value in the color separation data is larger than the predetermined value, the control unit makes the distribution ratio of distribution to the second nozzle array higher than or same as the distribution ratio of distribution to the first nozzle array.

6. The printing control apparatus according to claim 1, wherein the printing apparatus includes the first nozzle array and the second nozzle array for each of a plurality of colors, and the control unit makes a distribution ratio based on which the color separation data is distributed into data for the first nozzle array and data for the second nozzle array different for each of the colors depending on a tone value in the color separation data on the color.

7. The printing control apparatus according to claim 1, wherein the ink is a color ink, a reactive liquid, or an overcoat liquid.

8. A printing control method for controlling a printing apparatus including a first nozzle array having ejection ports configured to eject an ink of a predetermined color and arranged in a sub scanning direction and a second nozzle array having ejection ports configured to eject an ink of the predetermined color and arranged in the sub scanning direction, the printing apparatus printing an image in a predetermined region on a print medium by scanning the first nozzle array and the second nozzle array N times (where N is an integer of 2 or greater) in a main scanning direction intersecting with the sub scanning direction, the printing control method comprising:

performing control so that a distribution ratio based on which color separation data separated as having the predetermined color is distributed into data for the first nozzle array and a distribution ratio based on which the color separation data is distributed into data for the second nozzle array are different depending on a tone value in the color separation data; and generating printing data to be used for printing by the first nozzle array based on the distributed data for the first nozzle array and generating printing data to be used for printing by the second nozzle array based on the distributed data for the second nozzle array.

* * * * *